US012752766B2

(12) United States Patent
Bugge et al.

(10) Patent No.: US 12,752,766 B2
(45) Date of Patent: Oct. 6, 2026

(54) SYSTEM AND METHOD FOR DETERMINING WHEN A VEHICLE NEEDS MAINTENANCE

(71) Applicant: TOYOTA JIDOSHA KABUSHIKI KAISHA, Aichi-Ken (JP)

(72) Inventors: Stephen M. Bugge, Dayton, OH (US); Divya Garikapati, San Jose, CA (US)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 50 days.

(21) Appl. No.: 18/815,741

(22) Filed: Aug. 26, 2024

(65) Prior Publication Data

US 2026/0054713 A1 Feb. 26, 2026

(51) Int. Cl.
*B60W 10/20* (2006.01)
*B60W 30/12* (2020.01)
*B60W 50/14* (2020.01)

(52) U.S. Cl.
CPC ............ *B60W 10/20* (2013.01); *B60W 30/12* (2013.01); *B60W 50/14* (2013.01); *B60W 2520/30* (2013.01)

(58) Field of Classification Search
CPC ...... B60W 10/20; B60W 30/12; B60W 50/14; B60W 2520/30
USPC ........................................................... 701/41
See application file for complete search history.

(56) References Cited

U.S. PATENT DOCUMENTS 6,574,539 B1 * 6/2003 Ashrafi ................. G01M 17/06
702/104

OTHER PUBLICATIONS

Mahlberg, et al., "Prioritizing Roadway Pavement Marking Maintenance Using Lane Keep Assist Sensor Data," Sensors, MDPI, Aug. 12, 2021. (Year: 2021).*
Mahlberg, et al., "Prioritizing Roadway Pavement Marking Maintenance Using Lane Keep Assist Sensor Data," Sensors, MDPI, Aug. 12, 2021.

* cited by examiner

*Primary Examiner* — Maceeh Anwari
(74) *Attorney, Agent, or Firm* — SEYFARTH SHAW LLP

(57) ABSTRACT

A method for a vehicle maintenance/repair detection system is described. The method includes logging, in a vehicle log, advanced driver assistance system (ADAS) actuations during a road trip. The method also includes analyzing the vehicle log to identify the ADAS actuations during the road trip to correct a trajectory of an ego vehicle. The method further includes analyzing a correction of the trajectory of the ego vehicle to determine a direction of the ADAS actuations to correct the trajectory of the ego vehicle. The method also includes determining a maintenance/repair for the ego vehicle according to the direction and a frequency of the ADAS actuations to correct the trajectory of the ego vehicle.

16 Claims, 12 Drawing Sheets

800

870

SYSTEM AND METHOD FOR DETERMINING WHEN A VEHICLE NEEDS MAINTENANCE

BACKGROUND

Field

Certain aspects of the present disclosure relate to autonomous vehicle technology and, more particularly, to a system and method for determining when a vehicle needs maintenance/repair.

Background

Autonomous agents (e.g., vehicles, robots, etc.) rely on machine vision and sensors (IMU, GPS, etc.) for estimating the agent's state (velocity, position, etc.) for sensing a surrounding environment by analyzing areas of interest in a scene from images of the surrounding environment. Autonomous agents, such as driverless cars and robots, are quickly evolving and have become a reality in this decade. The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle, then the autonomous vehicle with a higher-level number offers a greater combination and quantity of autonomous features relative to the other vehicle.

These various levels of autonomous vehicles may provide a safety system that improves driving of a vehicle by providing a set of advanced driver assistance system (ADAS) features. The set of ADAS features installed in the autonomous vehicle may be a lane centering assistance system and/or a lane departure warning system. For example, ADAS features such as lane change assist (LCA) systems as well as lane keeping assist (LKA) systems provide torque to the steering wheel of a vehicle as well as auditory warning for providing guidance to the vehicle operator.

As automated systems take over more driving activities, the driver's experiential feeling of vehicle performance and maintenance specification are consequently reduced. A system for determining when a vehicle needs maintenance, is desired.

SUMMARY

A method for a vehicle maintenance/repair detection system is described. The method includes logging, in a vehicle log, advanced driver assistance system (ADAS) actuations during a road trip. The method also includes analyzing the vehicle log to identify the ADAS actuations during the road trip to correct a trajectory of an ego vehicle. The method further includes analyzing a correction of the trajectory of the ego vehicle to determine a direction of the ADAS actuations to correct the trajectory of the ego vehicle. The method also includes determining a maintenance/repair for the ego vehicle according to the direction and a frequency of the ADAS actuations to correct the trajectory of the ego vehicle.

A non-transitory computer-readable medium having program code recorded thereon for a vehicle maintenance/repair detection system is described. The program code is executed by a processor. The non-transitory computer-readable medium includes program code to log, in a vehicle log, advanced driver assistance system (ADAS) actuations during a road trip. The non-transitory computer-readable medium also includes program code to analyze the vehicle log to identify the ADAS actuations during the road trip to correct a trajectory of an ego vehicle. The non-transitory computer-readable medium further includes program code to analyze a correction of the trajectory of the ego vehicle to determine a direction of the ADAS actuations to correct the trajectory of the ego vehicle. The non-transitory computer-readable medium also includes program code to determine a maintenance/repair for the ego vehicle according to the direction and a frequency of the ADAS actuations to correct the trajectory of the ego vehicle.

A vehicle maintenance/repair detection system is described. The system includes a vehicle log module to log, in a vehicle log, advanced driver assistance system (ADAS) actuations during a road trip. The system also includes a trajectory correction identification module to analyze the vehicle log to identify the ADAS actuations during the road trip to correct a trajectory of an ego vehicle. The system further includes a direction and frequency module to analyze a correction of the trajectory of the ego vehicle to determine a direction of the ADAS actuations to correct the trajectory of the ego vehicle. The system also includes a maintenance/repair module to determine a maintenance/repair for the ego vehicle according to the direction and a frequency of the ADAS actuations to correct the trajectory of the ego vehicle.

This has outlined, broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
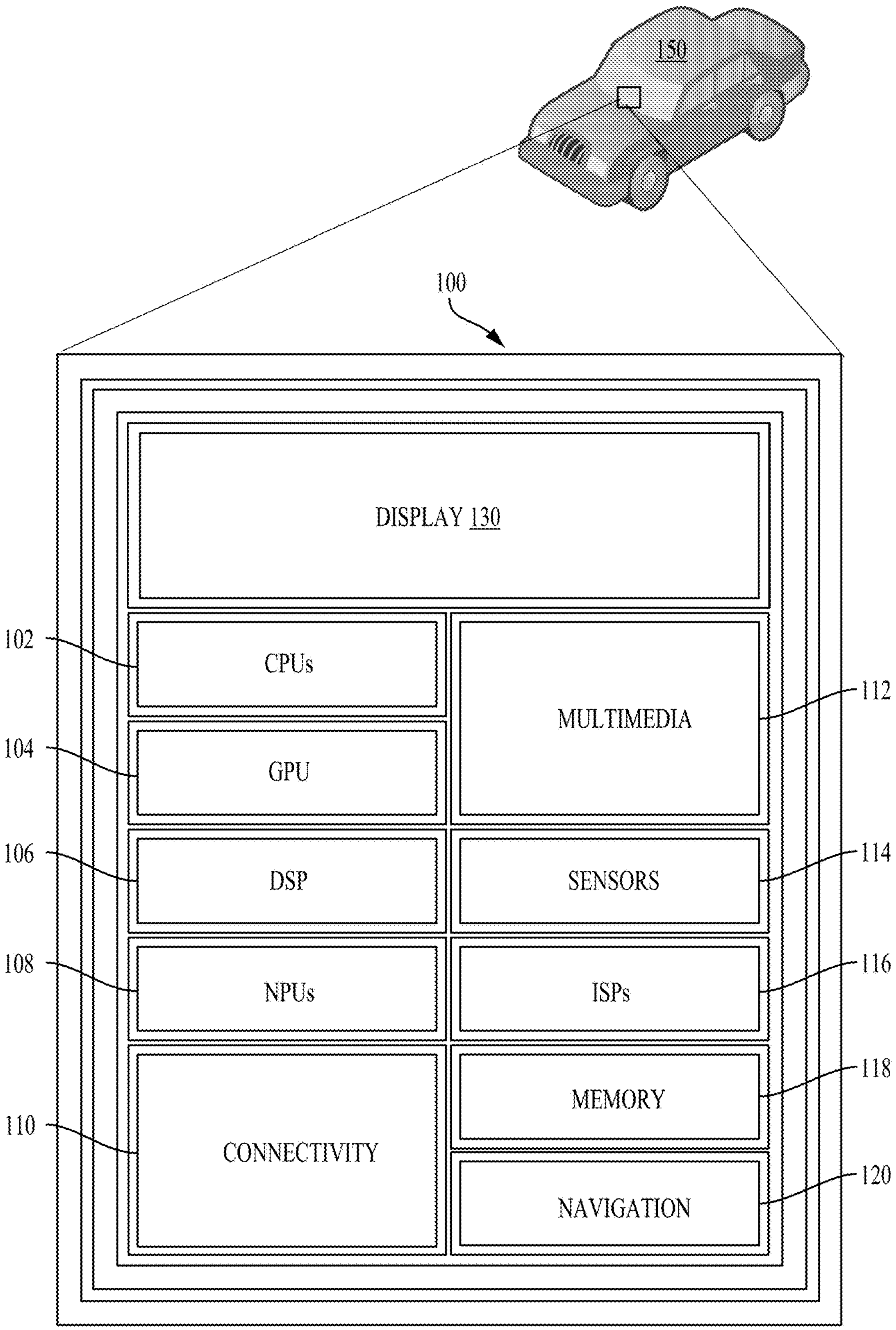
FIG. 1 illustrates an example implementation using a system-on-a-chip (SOC) for a vehicle maintenance detection system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. Any aspect of the present disclosure disclosed may be embodied by one or more elements of a claim.

Although aspects are described herein, many variations and permutations of these aspects fall within the scope of the present disclosure. Although some benefits and advantages of the preferred aspects are mentioned, the scope of the present disclosure is not intended to be limited to benefits, uses, or objectives. Rather, aspects of the present disclosure are intended to be universally applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

The National Highway Traffic Safety Administration ("NHTSA") has defined different "levels" of autonomous vehicles (e.g., Level 0, Level 1, Level 2, Level 3, Level 4, and Level 5). These various levels of autonomous vehicles may provide a safety system that improves driving of a vehicle. For example, in a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle. The set of ADAS features installed in the autonomous vehicle may be a lane centering assistance system, a lane departure warning system, and/or a brake assistance system and, in some configurations, intervene automatically in a guardian-mode as part of a shared control system.

Vehicles, from time to time, may require maintenance or repairs for desired driver satisfaction and smooth interaction with ADAS features as well as a shared control system. Typically, a determination regarding maintenance or repairs is based on following a maintenance schedule, diagnostic trouble codes output by a vehicle diagnostic system, and/or general observations from the driver or mechanic. For example, a driver may notice that their vehicle may be pulling in one direction often in that the vehicle requires alignment, new tires, suspension work, etc. As automated and/or shared control systems take over more driving activities, however, the driver's experiential feeling of vehicle performance and maintenance specifications are consequently reduced. A system for determining when an autonomous or semi-autonomous vehicle needs maintenance, is desired.

Various aspects of the present disclosure are directed to a vehicle maintenance detection system. Specifically, in some aspects of the present disclosure, a vehicle log is utilized for logging advanced driver assistance system (ADAS) actuations during a road trip. Additionally, the vehicle log is analyzed to identify the ADAS features actuated to correct a trajectory of an ego vehicle during the road trip. Once identified, the correction of the trajectory of the ego vehicle is analyzed to determine a direction of the ADAS features actuated to correct the trajectory of the ego vehicle. In response, a maintenance/repair for the ego vehicle is determined according to the direction and a frequency of the ADAS features actuated to correct the trajectory of the ego vehicle.

FIG. 1 illustrates an example implementation of the system and method for a vehicle maintenance detection system using a system-on-a-chip (SOC) 100 of a vehicle 150. The SOC 100 may include a single processor or multi-core processors (e.g., a central processing unit (CPU) 102), in accordance with certain aspects of the present disclosure. Variables, system parameters associated with a computational device, delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include sixth generation (6G) cellular network technology, fifth generation (5G) new radio (NR) technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle safety action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. Each processor core of the CPU 102 may be a reduced instruction set computing (RISC) machine, RISC-V, an advanced RISC machine (ARM), a microprocessor, or any reduced instruction set computing (RISC) architecture. The NPU 108 may be based on an Advanced Risk Machine (ARM) instruction set.

The SOC 100 may be based on an ARM instruction set or the like. In another aspect of the present disclosure, the SOC 100 may be a server computer in communication with the vehicle 150. In this arrangement, the vehicle 150 may include a processor and other features of the SOC 100. In this aspect of the present disclosure, instructions loaded into a processor (e.g., CPU 102) or the NPU 108 of the vehicle 150 may include program code to perform a determination of when an autonomous or semi-autonomous vehicle needs maintenance. For example, a vehicle maintenance detection system may determine when a vehicle is due for maintenance or requires repairs by monitoring how often a lane keeping assist (LKA) system is actuated.

The instructions loaded into a processor (e.g., NPU 108) may also include program code to log advanced driver assistance system (ADAS) actuations in a vehicle log during a road trip. The instructions loaded into a processor (e.g., NPU 108) may also include program code to analyze the vehicle log to identify the ADAS features actuated to correct a trajectory of an ego vehicle during the road trip. The instructions loaded into the processor (e.g., NPU 108) may also include program code to analyze the correction of the trajectory of the ego vehicle to determine a direction of the ADAS features actuated to correct the trajectory of the ego vehicle. The instructions loaded into the processor (e.g., NPU 108) may also include program code to determine a maintenance/repair for the ego vehicle according to the direction and a frequency of the ADAS features actuated to correct the trajectory of the ego vehicle.

Figure 2:
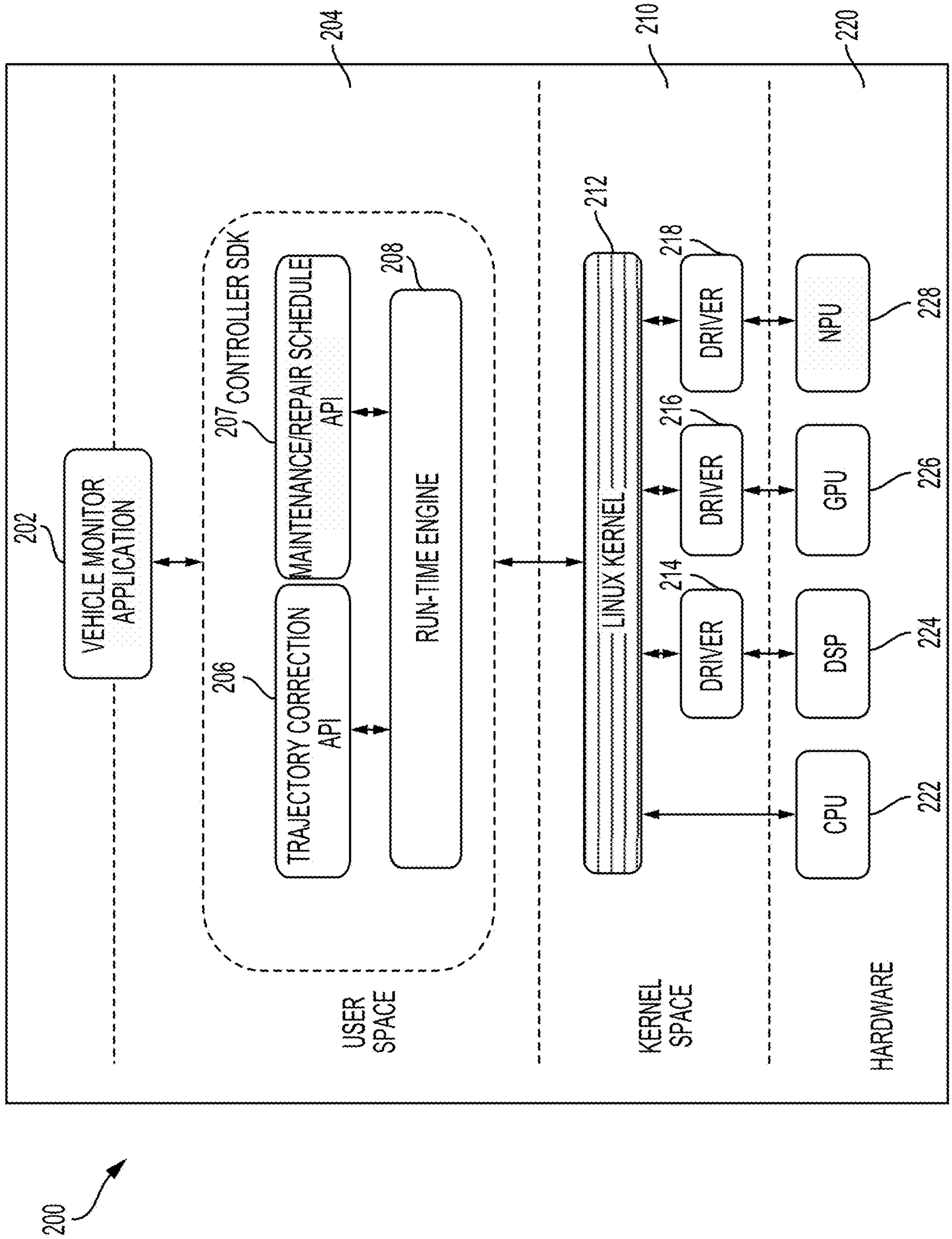
FIG. 2 is a block diagram illustrating a software architecture that may modularize artificial intelligence (AI) functions for a vehicle maintenance/repair detection system of an autonomous agent, according to aspects of the present disclosure.

FIG. 2 is a block diagram illustrating a software architecture 200 that may modularize artificial intelligence (AI) functions for a vehicle maintenance/repair detection system, according to aspects of the present disclosure. Using the software architecture 200, a vehicle monitor application 202 may be designed such that it may cause various processing blocks of a system-on-a-chip (SOC) 220 (e.g., a CPU 222, a DSP 224, a GPU 226, and/or an NPU 228) to perform supporting computations during run-time operation of a vehicle. While FIG. 2 describes the software architecture 200 for shared vehicle control features, it should be recognized that vehicle maintenance/repair detection features are not limited to autonomous agents. According to aspects of the present disclosure, a vehicle maintenance detection system is applicable to any vehicle type, provided the vehicle is equipped with appropriate functions of an advanced driver assistance system (ADAS).

The vehicle monitor application 202 may be configured to call functions defined in a user space 204 that may, for example, provide for vehicle maintenance detection services. The vehicle monitor application 202 may make a request to compile program code associated with a library defined in a trajectory correction application programming interface (API) 206 to analyze a vehicle log to identify ADAS features actuated to correct a trajectory of an ego vehicle during the road trip. The trajectory correction API 206 may also analyze the correction of the trajectory of the ego vehicle to determine a direction of the ADAS features actuated to correct the trajectory of the ego vehicle.

The vehicle monitor application 202 may also make a request to compile program code associated with a maintenance/repair schedule API 207 to determine a maintenance/repair for the ego vehicle according to the direction and a frequency of the ADAS features actuated to correct the trajectory of the ego vehicle. For example, the vehicle monitor application 202 may utilize the maintenance/repair schedule API 207 to determine when a vehicle is due for maintenance or requires repairs by monitoring how often a lane keeping assist (LKA) system is actuated.

A run-time engine 208, which may be compiled code of a runtime framework, may be further accessible to the vehicle monitor application 202. The vehicle monitor application 202 may cause the run-time engine 208, for example, to take actions for communicating with a vehicle operator. When the vehicle operator begins to interact with a vehicle interface, the run-time engine 208 may in turn send a signal to an operating system 210, such as a Linux Kernel 212, running on the SOC 220. FIG. 2 illustrates the Linux Kernel 212 as software architecture for implementing maintenance/repair detection for the vehicle. It should be recognized; however, aspects of the present disclosure are not limited to this exemplary software architecture. For example, other kernels may be used to provide the software architecture to support the vehicle maintenance/repair functionality using the ADAS features actuated to correct a trajectory of the vehicle.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, a nonlinear model predictive control may be configured to run on a combination of processing blocks, such as the CPU 222 and the GPU 226, or may be run on the NPU 228 if present.

Figure 3:
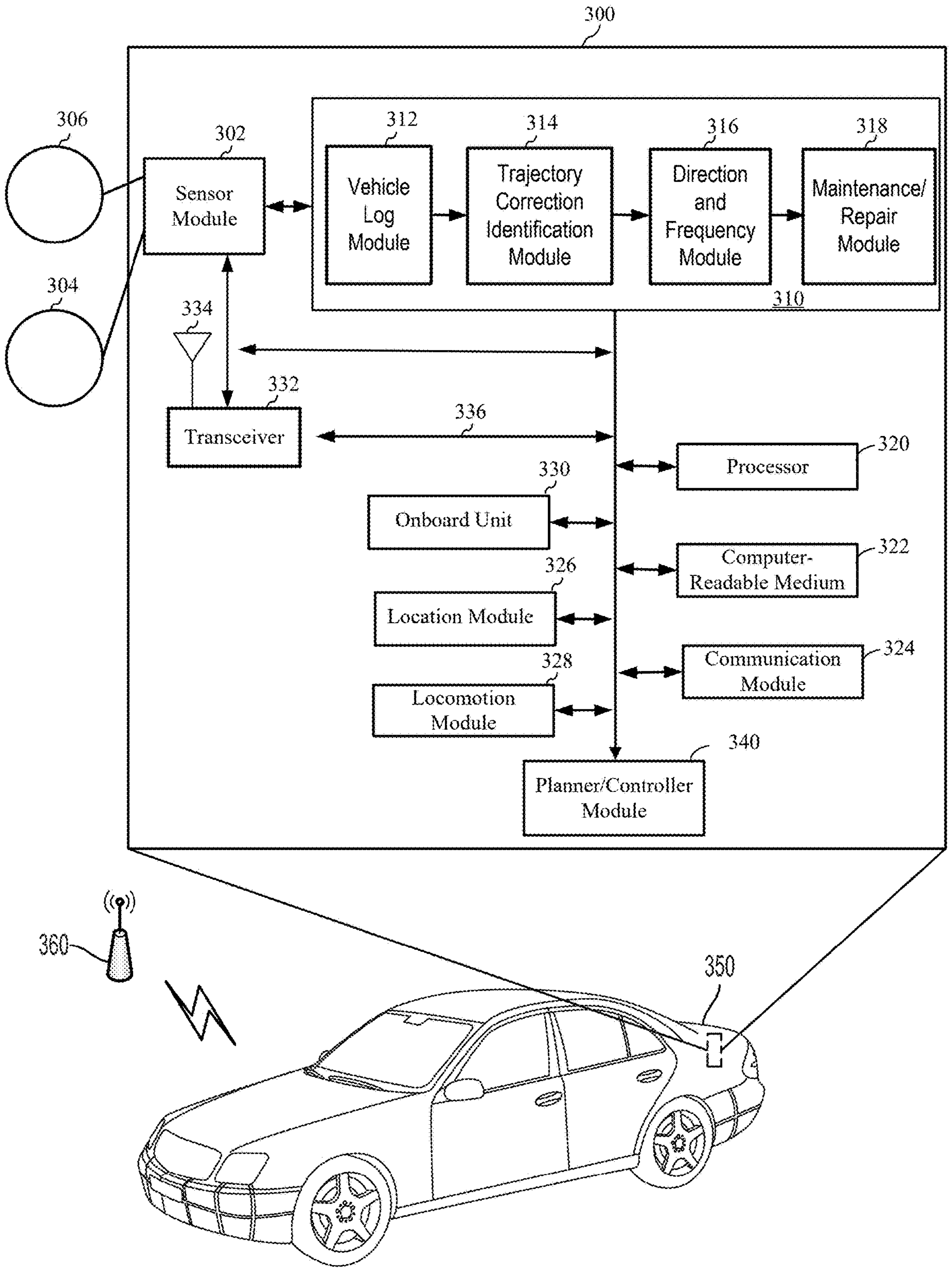
FIG. 3 is a diagram illustrating an example of a hardware implementation for a vehicle maintenance/repair detection system, according to aspects of the present disclosure.

FIG. 3 is a diagram illustrating an example of a hardware implementation for a vehicle maintenance/repair detection system 300, according to aspects of the present disclosure. The vehicle maintenance/repair detection system 300 may be configured to vehicle trajectory correction during operation of a vehicle 350 to determine whether the vehicle should undergo repair/maintenance. The vehicle maintenance/repair detection system 300 may be a component of a vehicle or other non-autonomous device (e.g., semi-autonomous vehicle). For example, as shown in FIG. 3, the vehicle maintenance/repair detection system 300 is a component of the vehicle 350.

Aspects of the present disclosure are not limited to the vehicle maintenance/repair detection system 300 being a component of the vehicle 350. Other devices, such as a bus, motorcycle, or other like non-autonomous vehicle, are also contemplated for implementing the vehicle maintenance/repair detection system 300. In this example, the vehicle 350 may be autonomous or semi-autonomous; however, other configurations for the vehicle 350 are contemplated, such as an advanced driver assistance system (ADAS).

The vehicle maintenance/repair detection system 300 may be implemented with an interconnected architecture, such as a controller area network (CAN) bus, represented by an interconnect 336. The interconnect 336 may include any number of point-to-point interconnects, buses, and/or bridges depending on the specific application of the vehicle maintenance/repair detection system 300 and the overall design constraints. The interconnect 336 links together various circuits including one or more processors and/or hardware modules, represented by a sensor module 302, a vehicle monitor 310, a processor 320, a computer-readable medium 322, a communication module 324, a location module 326, a locomotion module 328, an onboard unit 330, and a planner/controller module 340. The interconnect 336 may also link various other circuits such as timing sources, peripherals, voltage regulators, and power management circuits, which are well known in the art, and therefore, will not be described further.

The vehicle maintenance/repair detection system 300 includes a transceiver 332 coupled to the sensor module 302, the vehicle monitor 310, the processor 320, the computer-readable medium 322, the communication module 324, the location module 326, the locomotion module 328, the onboard unit 330, and the planner/controller module 340. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information to/from connected vehicles within the vicinity of the vehicle 350.

The vehicle maintenance/repair detection system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle maintenance/repair detection system 300 to determine a maintenance/repair for the vehicle 350 according to a direction and a frequency of the ADAS features actuated to correct the trajectory of the vehicle 350. The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images of the vehicle operator. The second sensor 304 may be a ranging sensor, such as a light detection and ranging (LIDAR) sensor or a radio detection and ranging (RADAR) sensor for capturing an external vehicle environment. Of course, aspects of the present disclosure are not limited to the sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle monitor 310, the communication module 324, the location module 326, the locomotion module 328, the onboard unit 330, and/or the planner/controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the vehicle 350 or may be in communication with the vehicle 350.

The location module 326 may determine a location of the vehicle 350. For example, the location module 326 may use a global positioning system (GPS) to determine the location of the vehicle 350. The location module 326 may implement a dedicated short-range communication (DSRC)-compliant GPS unit. A DSRC-compliant GPS unit includes hardware and software to make the vehicle 350 and/or the location module 326 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 6G, 5G NR, WiFi, long term evolution (LTE), 4G, 3G, etc. The communication module 324 may also communicate with other components of the vehicle 350 that are not modules of the vehicle maintenance/repair detection system 300. The transceiver 332 may be a communications channel through a network access point 360. The communications channel may include DSRC, 6G, 5G NR, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G NR, 6G, LTE, LTE-V2X, LTE-D2D, VoLTE, or any other mobile data network or combination of mobile data networks. Further, the network access point 360 may include one or more IEEE 802.11 wireless networks.

The vehicle maintenance/repair detection system 300 also includes the planner/controller module 340 for planning a route and controlling the locomotion of the vehicle 350, via the locomotion module 328 for autonomous operation of the vehicle 350. In one configuration, the planner/controller module 340 may override a user input when the user input is expected (e.g., predicted) to cause a collision according to an autonomous level of the vehicle 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. These distinct levels of autonomous vehicles are described briefly below.

Level 0: In a Level 0 vehicle, the set of advanced driver assistance system (ADAS) features installed in a vehicle provide no vehicle control but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks but is still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the district where the vehicle is located).

A highly autonomous vehicle ("HAV") is an autonomous vehicle that is Level 3 or higher. Accordingly, in some configurations the vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle monitor 310 may be in communication with the sensor module 302, the processor 320, the computer-readable medium 322, the communication module 324, the location module 326, the locomotion module 328, the onboard unit 330, the transceiver 332, and the planner/controller module 340. In one configuration, the vehicle monitor 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle monitor 310 may receive sensor data directly from the first sensor 306 and the second sensor 304 to determine, for example, input traffic data images.

The vehicle 350, from time to time, may require maintenance or repairs for desired driver satisfaction and smooth interaction with ADAS features as well as a shared control system. Typically, a determination regarding maintenance or repairs is based on following a maintenance schedule, diagnostic trouble codes output by a vehicle diagnostic system, and/or general observations from the driver or mechanic. For example, a driver may notice that the vehicle 350 may be pulling in one direction often in that the vehicle 350 requires alignment, new tires, suspension work, etc. As automated and/or shared control systems take over more driving activities, however, the driver's experiential feeling of vehicle performance and maintenance specifications are consequently reduced. Various aspects of the present disclosure are directed to the vehicle maintenance/repair detection system 300.

As shown in FIG. 3, the vehicle maintenance/repair detection system 300 includes the vehicle monitor 310 that includes a vehicle log module 312, a trajectory correction identification module 314, a direction and frequency module 316, and a maintenance/repair module 318. The vehicle log module 312, the trajectory correction identification module 314, the direction and frequency module 316, and the maintenance/repair module 318 may be implemented using an artificial neural network (ANN), such as a convolutional neural network (CNN). The vehicle monitor 310 is not limited to using a CNN.

Specifically, in some aspects of the present disclosure, the vehicle log module 312 is utilized for logging advanced driver assistance system (ADAS) actuations during a road trip of the vehicle 350. Additionally, the trajectory correction identification module 314 is configured to analyze the vehicle log to identify the ADAS features actuated to correct a trajectory of the vehicle 350 during the road trip. Once identified, the direction and frequency module 316 is configured to analyze the correction of the trajectory of the ego vehicle to determine a direction of the ADAS features actuated to correct the trajectory of the vehicle 350 and a frequency of actuating the ADAS features. In response, the maintenance/repair module 318 determines whether the vehicle 350 needs maintenance/repair according to the direction and the frequency of the ADAS features actuated to correct the trajectory of the vehicle 350.

As described in further detail below, the vehicle maintenance/repair detection system 300 may utilize the maintenance/repair module 318 to determine when a vehicle is due for maintenance or requires repairs by monitoring how often a lane keeping assist (LKA) system is actuated. Various aspects of the present disclosure may be implemented in an agent, such as a vehicle. The vehicle may operate in either an autonomous mode, a semi-autonomous mode, or a manual mode. In some examples, the vehicle may switch between operating modes.

Figure 4A:
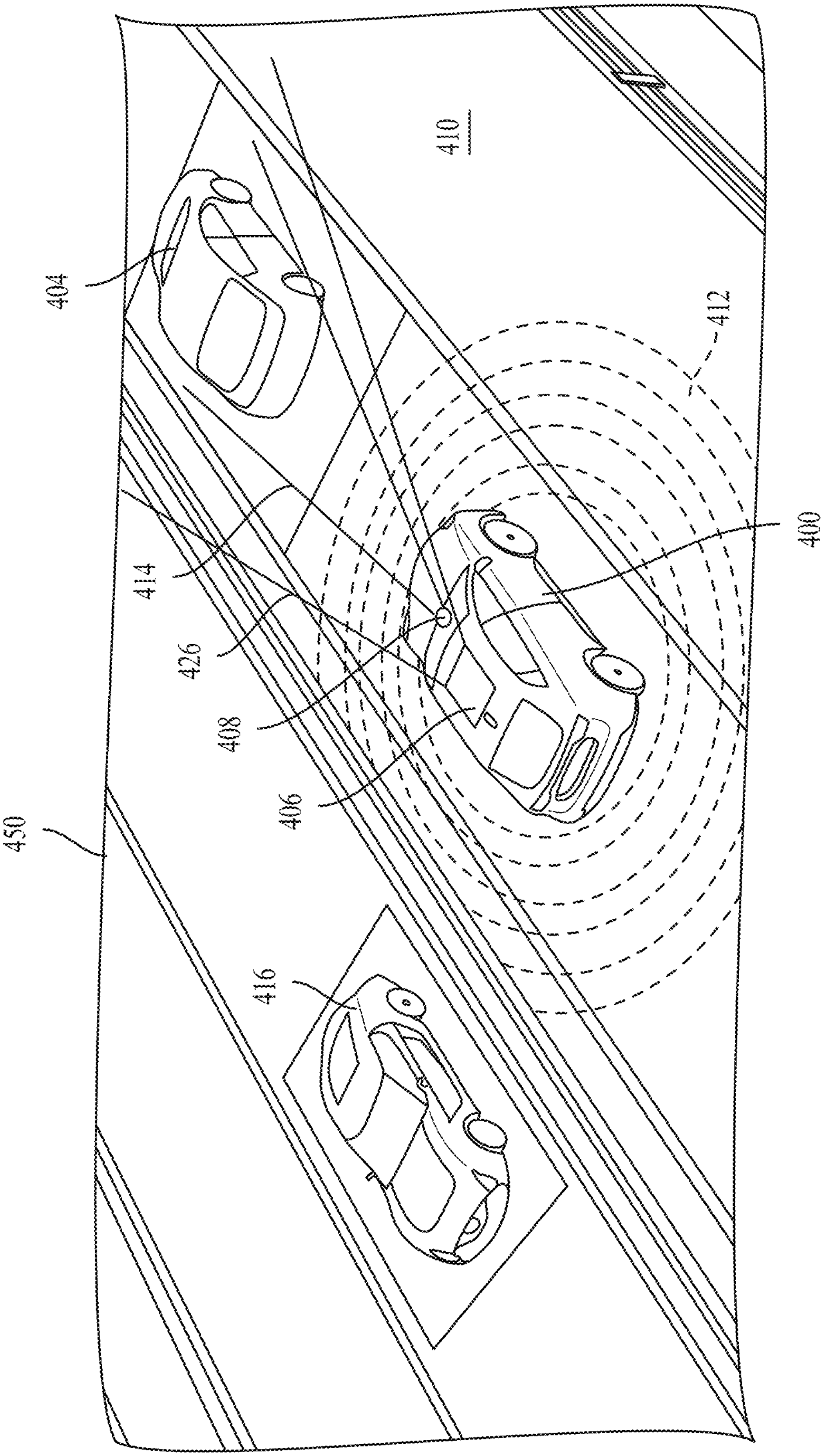
FIGS. 4A-4B are block diagrams illustrating a vehicle configured with a vehicle maintenance/repair system, according to aspects of the present disclosure.
Figure 4B:
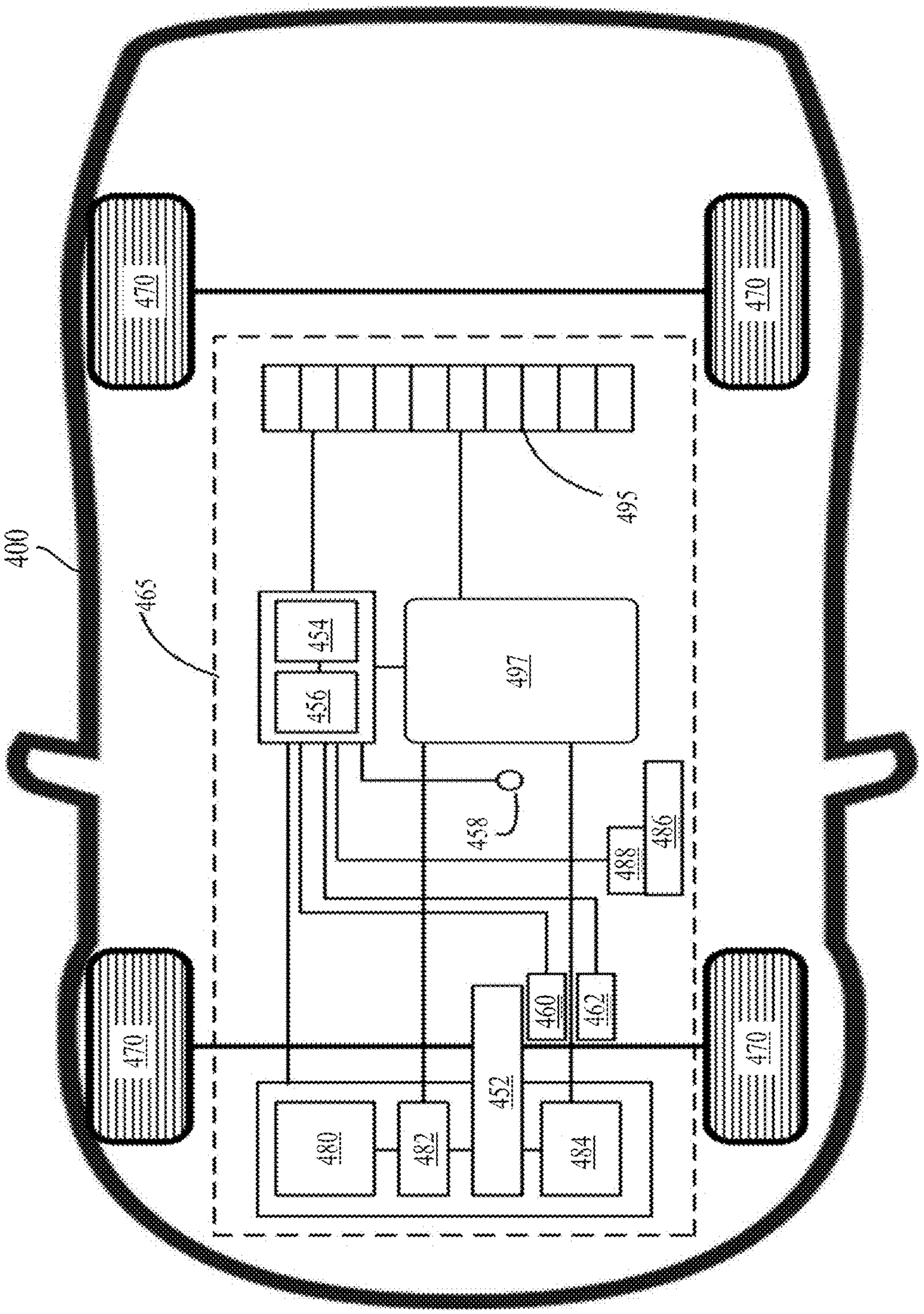

FIGS. 4A-4B are block diagrams illustrating a vehicle configured with a vehicle maintenance/repair detection system, according to aspects of the present disclosure.

FIG. 4A is a diagram illustrating an example of a vehicle 400 in an environment 450, in accordance with various aspects of the present disclosure. In the example of FIG. 4A, the vehicle 400 may be an autonomous vehicle, a semi-autonomous vehicle, or a non-autonomous vehicle. As shown in FIG. 4A, the vehicle 400 may be traveling on a road 410. A first vehicle 404 may be ahead of the vehicle 400 and a second vehicle 416 may be adjacent to the vehicle 400. In this example, the vehicle 400 may include a 2D camera 408, such as a 2D red-green-blue (RGB) camera, and a LIDAR sensor 406. The 2D camera 408 and the LIDAR sensor 406 may be components of an overall sensor system (e.g., the sensor module 302). Other sensors, such as radar and/or ultrasound, are also contemplated. Additionally, or alternatively, although not shown in FIG. 4A, the vehicle 400 may include one or more additional sensors, such as a camera, a radar sensor, and/or a LIDAR sensor, integrated with the vehicle in one or more locations, such as within one or more storage locations (e.g., a trunk). Additionally, or alternatively, although not shown in FIG. 4A, the vehicle 400 may include one or more force measuring sensors.

In one configuration, the 2D camera 408 captures a 2D image that includes objects in the 2D camera's 408 field of view 414. The LIDAR sensor 406 may generate one or more output streams. The first output stream may include a three-dimensional (3D) cloud point of objects in a first field of view, such as a 360° field of view 412 (e.g., bird's eye view). The second output stream 424 may include a 3D cloud point of objects in a second field of view, such as a forward-facing field of view, such as the 2D camera's 408 field of view 414 and/or the 2D sensor's 406 field of view 426.

The 2D image captured by the 2D camera 408 includes a 2D image of the first vehicle 404, as the first vehicle 404 is in the 2D camera's 408 field of view 414. As is known to those of skill in the art, a LIDAR sensor 406 uses laser light to sense the shape, size, and position of objects in an environment. The LIDAR sensor 406 may vertically and horizontally scan the environment. In the current example, the artificial neural network (e.g., autonomous driving system) of the vehicle 400 may extract height and/or depth features from the first output stream. In some examples, an autonomous driving system of the vehicle 400 may also extract height and/or depth features from the second output stream 424.

The information obtained from the LIDAR sensor 406 and the 2D camera 408 may be used to evaluate a driving environment. In some examples, the information obtained from the LIDAR sensor 406 and the 2D camera 408 may identify whether the vehicle 400 is at an intersection or a crosswalk. Additionally, or alternatively, the information obtained from the LIDAR sensor 406 and the 2D camera 408 may identify whether one or more dynamic objects, such as pedestrians, are near the vehicle 400.

FIG. 4B is a diagram illustrating an example of a vehicle 400, in accordance with various aspects of the present disclosure. Various aspects of the present disclosure may be directed to an autonomous vehicle. The autonomous vehicle may be an internal combustion engine (ICE) vehicle, fully electric vehicle (EV), or another type of vehicle. The vehicle 400 may include drive force unit 465 and wheels 470. The drive force unit 465 may include an engine 480, motor generators (MGs) 482 and 484, a battery 495, an inverter 497, a brake pedal 486, a brake pedal sensor 488, a transmission 452, a memory 454, an electronic control unit (ECU) 456, a shifter 458, a speed sensor 460, and an accelerometer 462.

The engine 480 primarily drives the wheels 470. The engine 480 can be an ICE that combusts fuel, such as gasoline, ethanol, diesel, biofuel, or other types of fuels which are suitable for combustion. The torque output by the engine 480 is received by the transmission 452. The MGs 482 and 484 can also output torque to the transmission 452. The engine 480 and the MGs 482 and 484 may be coupled through a planetary gear (not shown in FIG. 4B). The transmission 452 delivers an applied torque to one or more of the wheels 470. The torque output by the engine 480 does not directly translate into the applied torque to the one or more wheels 470.

The MGs 482 and 484 can serve as motors which output torque in a drive mode and can serve as generators to recharge the battery 495 in a regeneration mode. The electric power delivered from or to the MGs 482 and 484 passes through the inverter 497 to the battery 495. The brake pedal sensor 488 can detect pressure applied to the brake pedal 486, which may further affect the applied torque to the wheels 470. The speed sensor 460 is connected to an output shaft of the transmission 452 to detect a speed input which is converted into a vehicle speed by the ECU 456. The accelerometer 462 is connected to the body of the vehicle 400 to detect the actual deceleration of the vehicle 400, which corresponds to a deceleration torque.

The transmission 452 may be a transmission suitable for any vehicle. For example, the transmission 452 can be an electronically controlled continuously variable transmission (ECVT), which is coupled to the engine 480 as well as to the MGs 482 and 484. The transmission 452 can deliver torque output from a combination of the engine 480 and the MGs 482 and 484. The ECU 456 controls the transmission 452, utilizing data stored in the memory 454 to determine the applied torque delivered to the wheels 470. For example, the ECU 456 may determine that at a certain vehicle speed, the engine 480 should provide a fraction of the applied torque to the wheels 470 while one or both MGs 482 and 484 provide most of the applied torque. The ECU 456 and the transmission 452 can control an engine speed (NE) of the engine 480 independently of the vehicle speed (V).

The ECU 456 may include circuitry to control the above aspects of vehicle operation. Additionally, the ECU 456 may include, for example, a microcomputer that includes one or more processing units (e.g., microprocessors), memory storage (e.g., RAM, ROM, etc.), and I/O devices. The ECU 456 may execute instructions stored in memory to control one or more electrical systems or subsystems in the vehicle 400. Furthermore, the ECU 456 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 482 and 484 each may be a permanent magnet type synchronous motor including, for example, a rotor with a permanent magnet embedded therein. The MGs 482 and 484 may each be driven by an inverter controlled by a control signal from the ECU 456, to convert direct current (DC) power from the battery 495 to alternating current (AC) power and supply the AC power to the MGs 482 and 484. In some examples, a first MG 482 may be driven by electric power generated by a second MG 484. In embodiments where MGs 482 and 484 are DC motors, no inverter is required. The inverter 497, in conjunction with a converter assembly, may also accept power from one or more of the MGs 482 and 484 (e.g., during engine charging), convert this power from AC back to DC, and use this power to charge the battery 495 (hence the name, motor generator). The ECU 456 may control the inverter 497, adjust driving current supplied to the first MG 482, and adjust the current received from the second MG 484 during regenerative coasting and braking.

The battery 495 may be implemented as one or more batteries or other power storage devices including, for example, lead-acid batteries, lithium ion and nickel batteries, capacitive storage devices, and so on. The battery 495 may also be charged by one or more of the MGs 482 and 484, such as, for example, by regenerative braking or coasting, during which one or more of the MGs 482 and 484 operates as a generator. Alternatively, or additionally, the battery 495 can be charged by the first MG 482, for example, when the vehicle 400 is idle (not moving/not in drive). Further still, the battery 495 may be charged by a battery charger (not shown) that receives energy from the engine 480. The battery charger may be switched or otherwise controlled to engage/disengage it with the battery 495. For example, an alternator or generator may be coupled directly or indirectly to a drive shaft of the engine 480 to generate an electrical current because of the operation of the engine 480. Still other embodiments contemplate the use of one or more additional motor generators to power the rear wheels of the vehicle 400 (e.g., in vehicles equipped with 4-Wheel Drive), or using two rear motor generators, each powering a rear wheel.

The battery 495 may also power other electrical or electronic systems in the vehicle 400. In some examples, the battery 495 can include, for example, one or more batteries, capacitive storage units, or other storage reservoirs suitable for storing electrical energy that can be used to power one or both MGs 482 and 484. When the battery 495 is implemented using one or more batteries, the batteries can include, for example, nickel metal hydride batteries, lithium-ion batteries, lead acid batteries, nickel cadmium batteries, lithium-ion polymer batteries, or other types of batteries.

The vehicle 400 may operate in one of an autonomous mode, a manual mode, or a semi-autonomous mode. In the manual mode, a human driver manually operates (e.g., controls) the vehicle 400. In the autonomous mode, an autonomous control system (e.g., autonomous driving system) operates the vehicle 400 without human intervention. In the semi-autonomous mode, the human may operate the vehicle 400, and the autonomous control system may override or assist the human. For example, the autonomous control system may override the human to prevent a collision or to obey one or more traffic rules.

In various aspects of the present disclosure, implementation of the vehicle maintenance/repair detection system 300 of FIG. 3 in the vehicle 400 improves operation of the vehicle. In particular, the vehicle maintenance/repair detection system 300 determines when the vehicle 400 may be due for maintenance or repairs by monitoring how frequently a correction of the vehicle trajectory is performed. For example, a vehicle maintenance/repair detection system monitors how frequently a vehicle's lane keeping assist (LKA) system is activated in a particular direction (correction toward the left or right). Some implementations of the vehicle maintenance/repair detection system 300 may determine when certain vehicle maintenance or repairs are necessary, including front-wheel alignment, tire replacement, tire balance, and/or suspension maintenance/repair.

Figure 5:
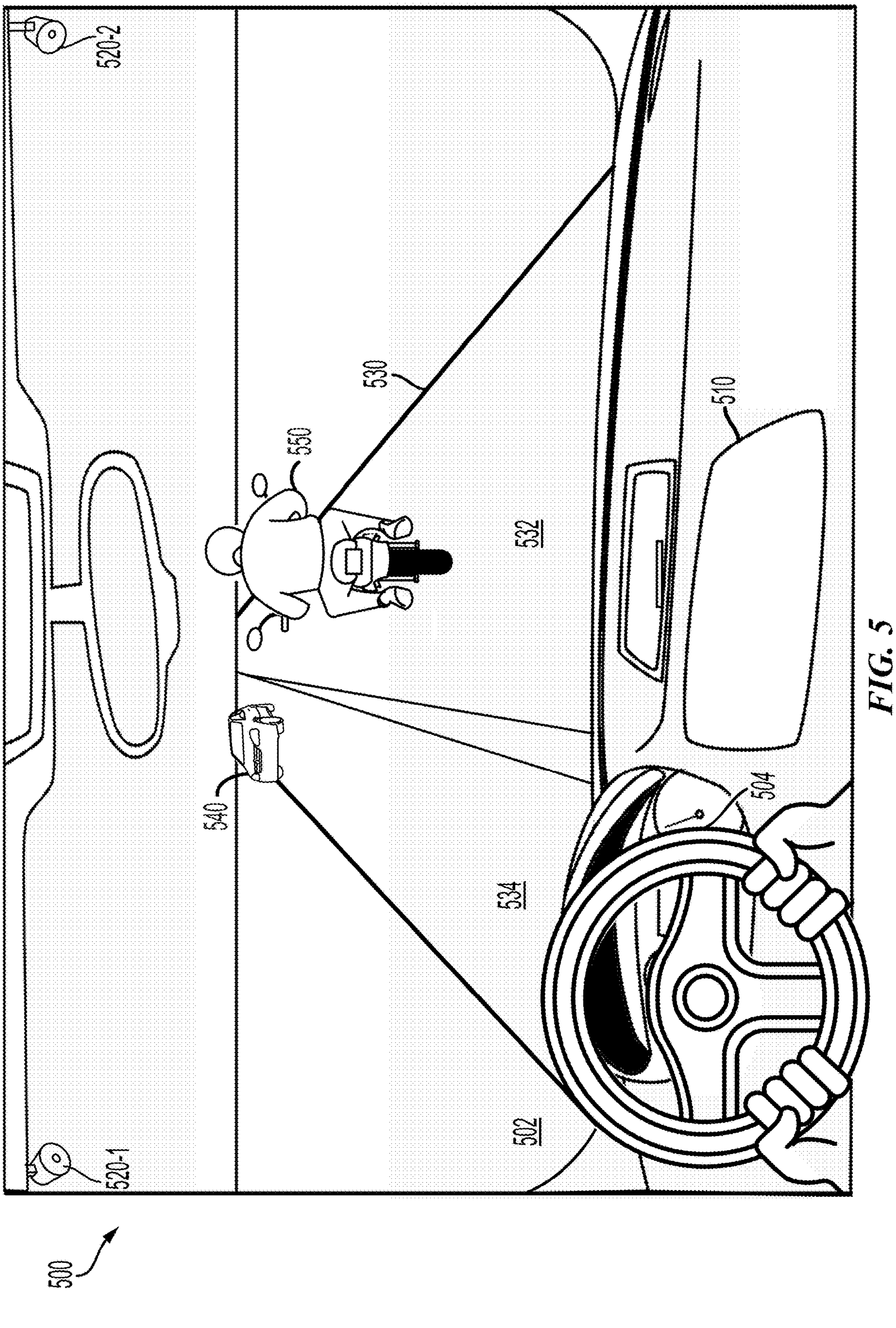
FIG. 5 illustrates a lane keeping assist (LKA) system during operation of a vehicle, according to various aspects of the present disclosure.

FIG. 5 illustrates a lane keeping assist (LKA) system during operation of a vehicle, according to aspects of the present disclosure. The LKA is an advanced driver assistance system (ADAS) feature that monitors the position of the vehicle with respect to roadway and highway lane boundaries. In response to monitoring the vehicle with respect to the lane boundaries, the LKA system applies torque to a vehicle steering wheel and/or pressure to the vehicle brakes when a lane departure is about to occur. In some implementations, the LKA system provides an audible alert and a slight nudge to the steering wheel for alerting a driver to take appropriate corrective action.

FIG. 5 illustrates a cabin of an ego vehicle 500, including a front windshield 502, a steering wheel 504, cameras 520 (520-1, 520-2) and a heads-up display (HUD) 510, which enables the operator of the vehicle to monitor operation of the ego vehicle 500 and receive alerts. In this example, the ego vehicle 500 is in a first lane 532 of a roadway 530, including a cycle 550 in the first lane 532 and an oncoming vehicle 540 in a second lane 534 of the roadway 530. As described, the cycle 550 and the oncoming vehicle 540 may be referred to as external road agents. In this example, the LKA system of the ego vehicle 500 detects a lane violation, as the ego vehicle 500 is straddling a centerline and has crossed over from the first lane 532 to the second lane 534 of the roadway 530.

Various aspects of the present disclosure recognize that the ego vehicle 500 may need alignment, new tires, suspension work, etc., when the vehicle steering keeps pulling in one direction or another. In one implementation, the vehicle maintenance/repair detection system 300 implemented in the ego vehicle 500 monitors how often ADAS actuations (e.g., the LKA actuations) are utilized to correct a vehicle trajectory. In operation, the LKA system determines the general location of the ego vehicle 500 within the first lane 532 of the roadway 530. As the ego vehicle 500 slowly moves from the center of the first lane 532 and towards the second lane 534 and there is no indication that this movement is intended (e.g., turn signal has not been actuated, route guidance does not indicate that a lane change should be made, etc.) the LKA system may apply a mild amount of torque to the steering wheel 504 to reposition the ego vehicle 500 within the first lane 532.

In various aspects of the present disclosure, the vehicle maintenance/repair detection system 300 implemented in the ego vehicle 500 determines how often the LKA system is actuated to correct the position of the ego vehicle 500 within the first lane 532, as well as the direction of the correction. Depending on how often the LKA system is actuated in the same direction, the vehicle maintenance/repair detection system 300 may determine that the ego vehicle 500 requires maintenance or service. When it is determined that maintenance or service is required, the ego vehicle 500 may provide the operator with the location of a service center, such as a nearby Toyota® dealership.

For example, assume the vehicle maintenance/repair detection system 300 determines that the LKA system was activated 25 times over a 100-mile range. Also, assume that 13 of the 25 times were to reposition the vehicle to the left, while 12 of the 25 times were to reposition the vehicle to the right. In this example, the vehicle maintenance/repair detection system 300 would determine that while the LKA system was routinely activated, it does not indicate that the ego vehicle 500 requires maintenance or repairs as the ego vehicle 500 is not significantly pulling to one side more than another.

In a second example, like before, assume the vehicle maintenance/repair detection system 300 determines that the LKA system is activated 25 times over the 100-mile range. Also, assume that 21 of the 25 times were to reposition the ego vehicle 500 to the left, while 4 of the 25 times were to reposition the ego vehicle 500 to the right. In this example, the vehicle maintenance/repair detection system 300 determines that the ego vehicle 500 requires maintenance or repairs. When this occurs, the vehicle maintenance/repair detection system 300 can provide the nearest or preferred dealership information to the operator via the head unit. The vehicle maintenance/repair detection system 300 may also can contact the dealership or repair location ahead of time and schedule an appropriate appointment. When the ego vehicle 500 is pulling in one direction more often than the other, the ego vehicle 500 may need alignment, new tires, suspension work, etc.

Figure 6:
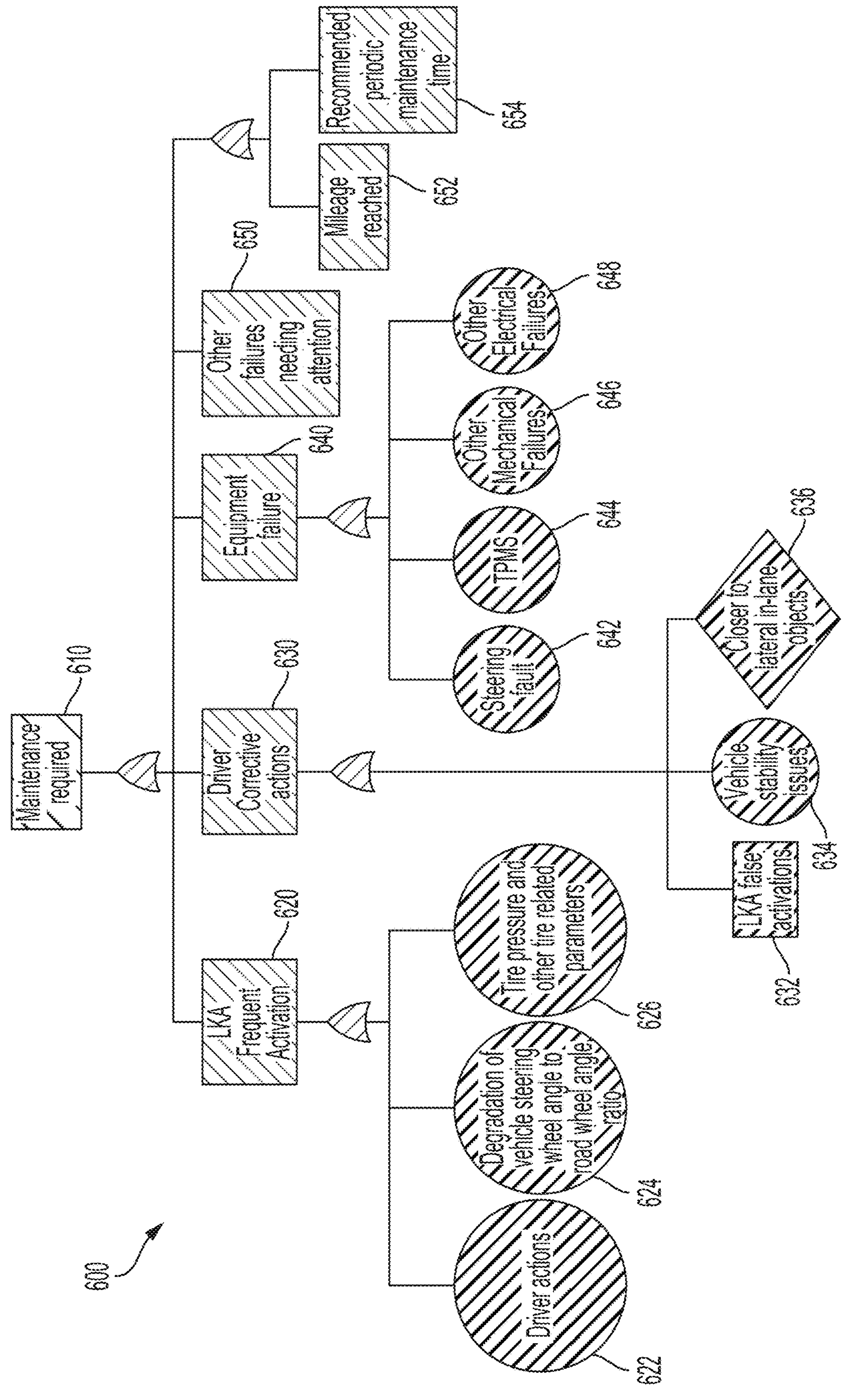
FIG. 6 is a block diagram illustrating a vehicle maintenance/repair detection process including factors for improving prediction accuracy, according to various aspects of the present disclosure.

FIG. 6 is a block diagram illustrating a vehicle maintenance/repair detection process 600 including factors for improving prediction accuracy, according to various aspects of the present disclosure. As shown in FIG. 6, a maintenance required block 610 indicates that a detected maintenance/repair is required for a vehicle, such as the ego vehicle 500 shown in FIG. 5. The vehicle maintenance/repair detection process 600 illustrates the various states for reaching the maintenance required block 610. For example, the maintenance required block 610 may be reached based on a lane keeping assist (LKA) frequent activation block 620, a driver corrective actions block 630, an equipment failure block 640, and a failure needing attention block 650. Additionally, the maintenance required block 610 may be reached based on a miles reached block 652 or a recommended periodic maintenance block 654.

In this example, the LKA frequent activation block 620 is triggered based on driver actions block 622, degradation of vehicle steering wheel angle to road wheel angle ratio 624, and/or a tire pressure and other tire related parameters block 626. If the driver actions block 622 indicates the driver is frequently correcting the trajectory of the vehicle in one direction more than the other, the vehicle maintenance/repair detection process 600 may determine that the vehicle requires maintenance or repairs at the maintenance required block 610. The vehicle maintenance/repair detection process 600 further includes factors for improving prediction accuracy, such as the driver corrective actions block 630.

In one implementation, instead of relying on how often the LKA system is activated in a particular direction at the LKA frequent activation block 620, the vehicle maintenance/repair detection process 600 instead monitors the driver corrective actions block 630 to improve prediction accuracy. For example, detected torque inputs to the steering wheel by the driver due to vehicle stability issues 634 may be identified by the LKA false activations block 632. Additionally, the driver corrective actions block 630 may identify driver corrective actions due to a closer to lateral in-lane objects block 636. The driver corrective actions block 630 may not be indicative of required maintenance/repairs detection for the vehicle.

As shown in FIG. 6, the equipment failure block 640 is reached based on a steering fault block 642, a tire pressure measurement system (TPMS) block 644, a mechanical failures block 646, or an electrical failures block 648. In a Third Variation, a machine-learning (ML) model is trained based on the concept of prognostics using LKA-system-activation data mined from numerous vehicles. Such an approach could make the recommendation of service/repair more initiative-taking (earlier detection) and accurate compared with the single-vehicle embodiments above. The ML model could process both LKA-activation data as well as monitoring torque inputs, such as driver-torque corrective inputs. In one embodiment, the ML model analyzes the following inputs: (1) LKA activation; (2) driver corrective actions; (3) tire pressure and other parameters related to tires, such as diameter; (4) date of last maintenance; (5) degradation of vehicle steering wheel angle to road wheel angle ratio conversions over time; (6) date of last tire rotation; and (7) frequency of similar failures in the past.

Figure 7:
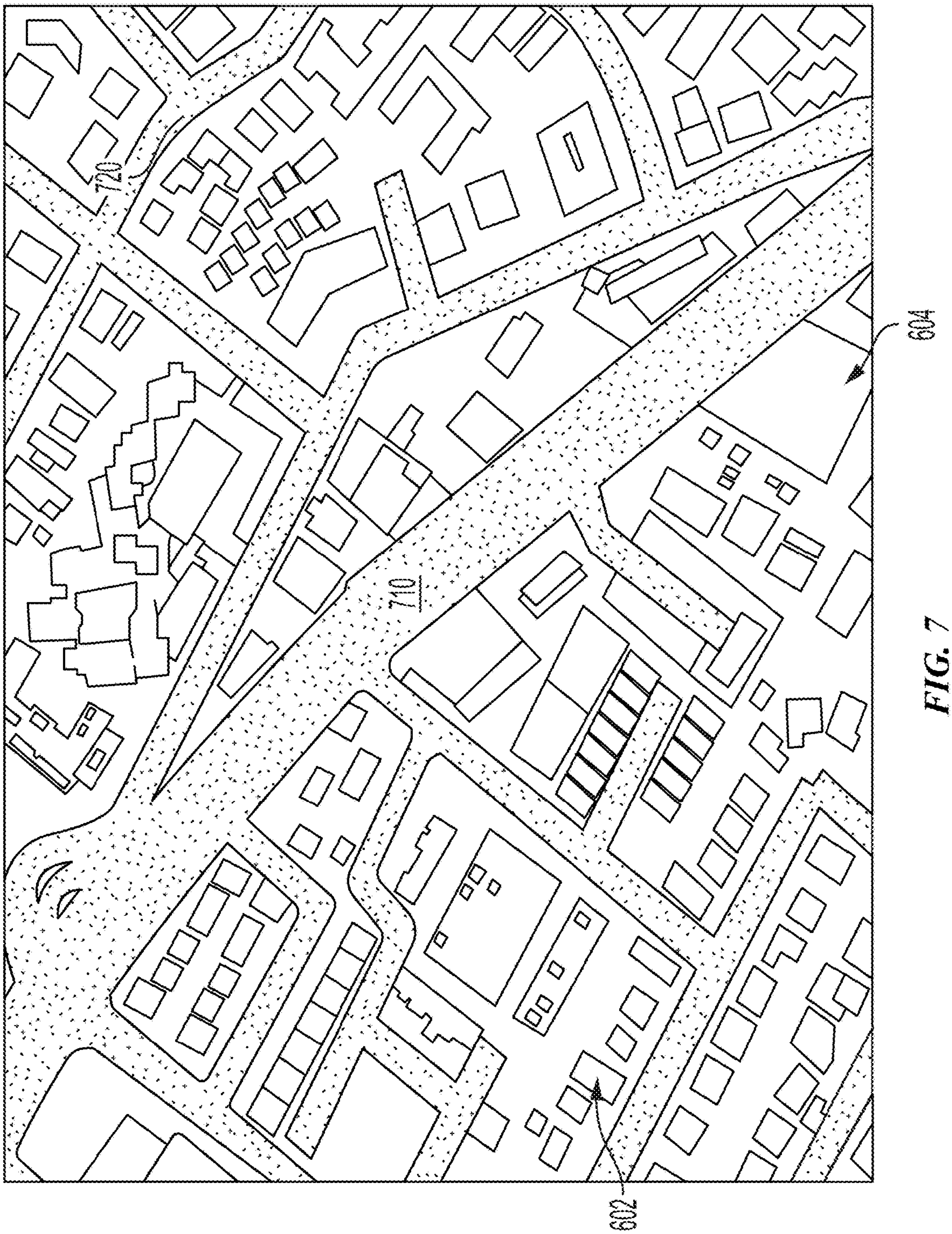
FIG. 7 illustrates a map overlay for differentiating locations of lane keeping assist (LKA) activation for use in a maintenance decision making process, according to various aspects of the present disclosure.

FIG. 7 illustrates a map overlay 700 for differentiating locations of lane keeping assist (LKA) activation for use in a maintenance decision making process, according to various aspects of the present disclosure. In one implementation, a vehicle maintenance/repair detection system compares the LKA-activation results for different roadways (e.g., a first roadway 710 and a second roadway 720) to consider the possibility that frequent activations of the LKA in one direction or the other were caused by construction defects or other roadway-condition factors. For example, the system might notice a lot of activations in a particular direction on the first roadway 710 but not on the second roadway 720. In such a case, the vehicle maintenance/repair detection system would not determine that service/repair is needed but would instead continue to collect information until a definitive pattern is observed.

Figure 8A:
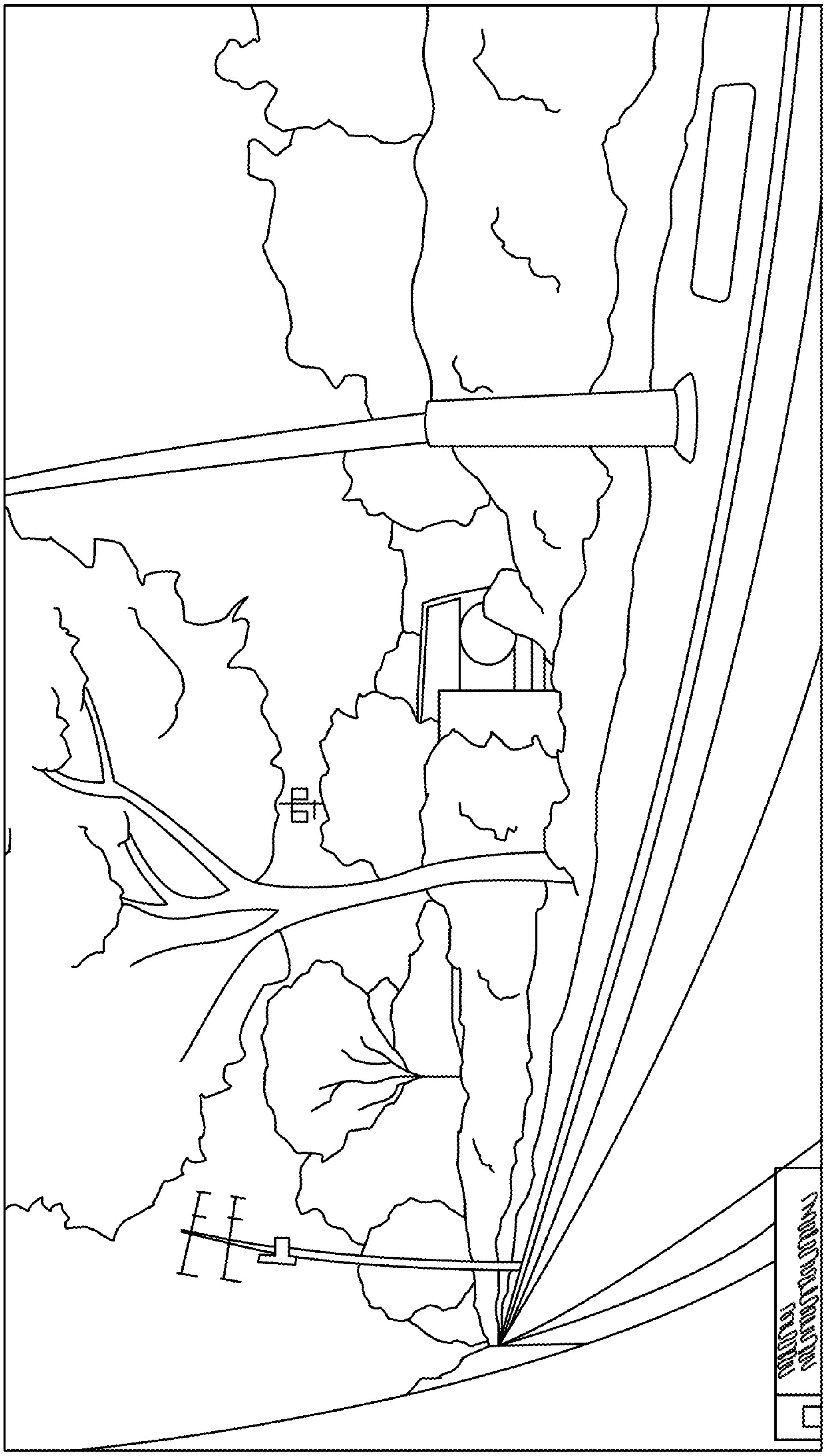
FIGS. 8A-8C illustrate captured images that may be utilized to improve prediction accuracy in a vehicle maintenance/repair detection process, according to various aspects of the present disclosure.
Figure 8B:
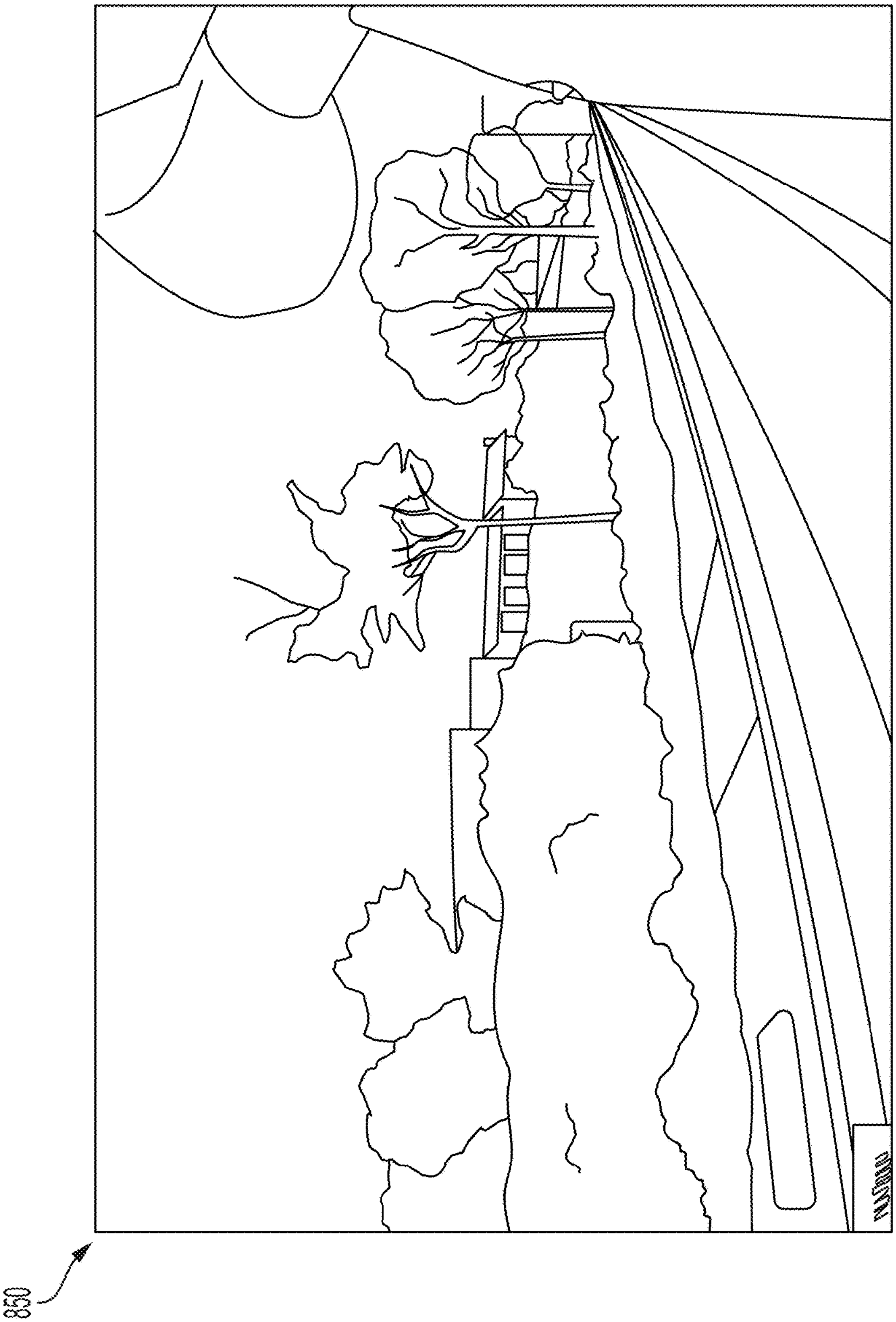
Figure 8C:
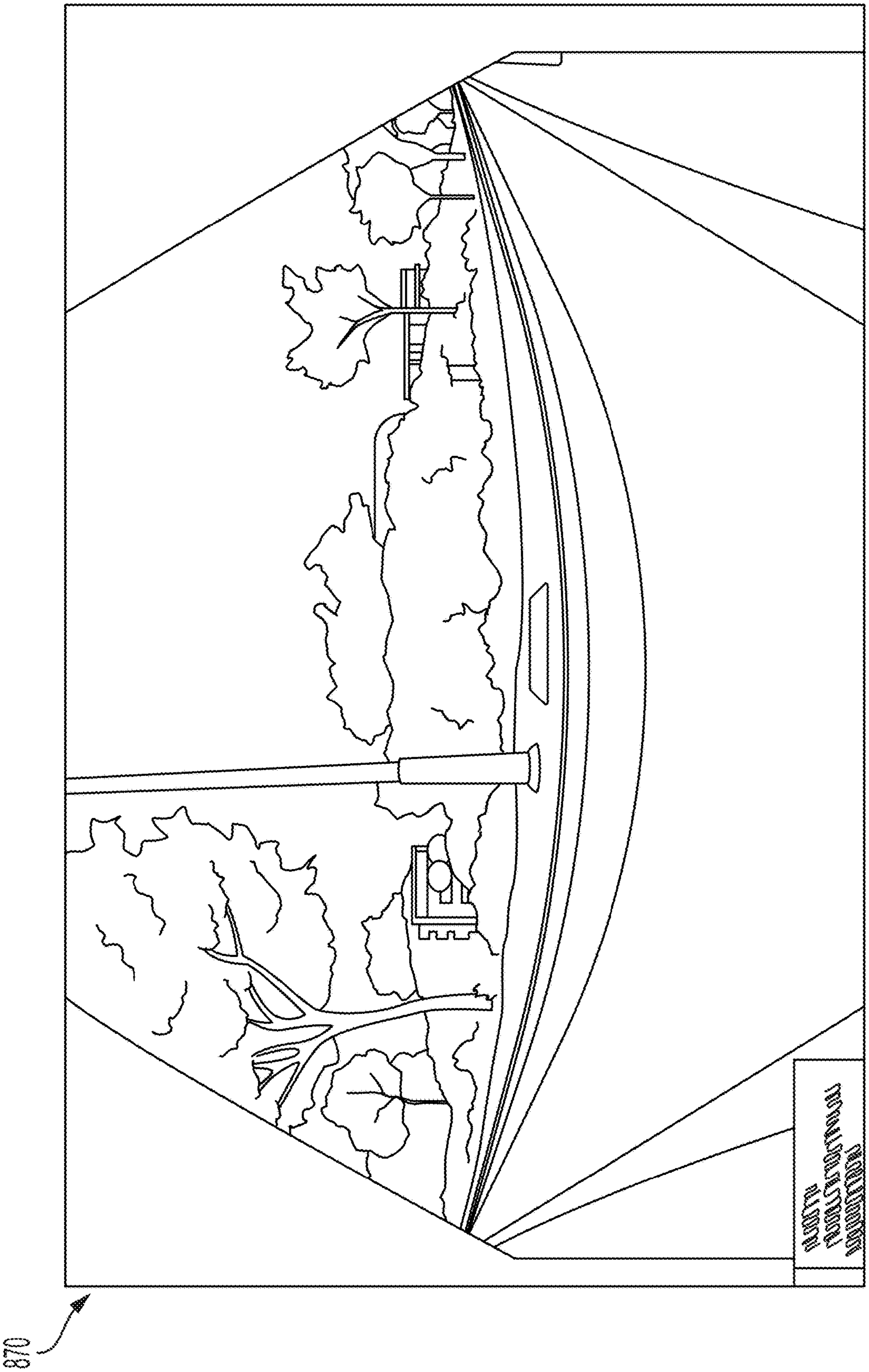

FIGS. 8A-8C illustrate captured images that may be utilized to improve prediction accuracy in a vehicle maintenance/repair detection process, according to various aspects of the present disclosure. According to various aspects of the present disclosure, a vehicle maintenance/repair detection system analyzes road hazard encounters (e.g., pothole or curb strikes) to weight determinations in favor of or against certain maintenance types. In this implementation, FIGS. 8A-8C illustrate camera angles that could factor in to detecting curb strikes for road hazard encounter event logs that could be used as a weighting factor in maintenance recommendation decisions, for example, as shown in FIG. 6. In some implementations, additional camera angles may be utilized to detect potholes and vehicle contact with potholes. According to the vehicle maintenance/repair detection process, curb strikes as well as vehicle contact with potholes are significant indicators of potent detection of maintenance/repair of a vehicle.

In various aspects of the present disclosure, the vehicle maintenance/repair detection system may be adapted to detect issues associated with the powertrain of an automatic transmission vehicle. For example, if additional power is routinely applied by the system to accelerate it is an indication of diminished performance. Additionally, the vehicle maintenance/repair detection system may be adapted to detect issues associated with braking systems, which could also be monitored based on vehicle behavior. Once a certain confidence level is reached, the vehicle maintenance/repair detection system is configured to function as an additional fail-safe for autonomous vehicles, disallowing engagement or disengaging if vehicle performance is determined to fall outside of specified parameters. A method for a vehicle maintenance/repair detection system is shown in FIG. 9.

Figure 9:
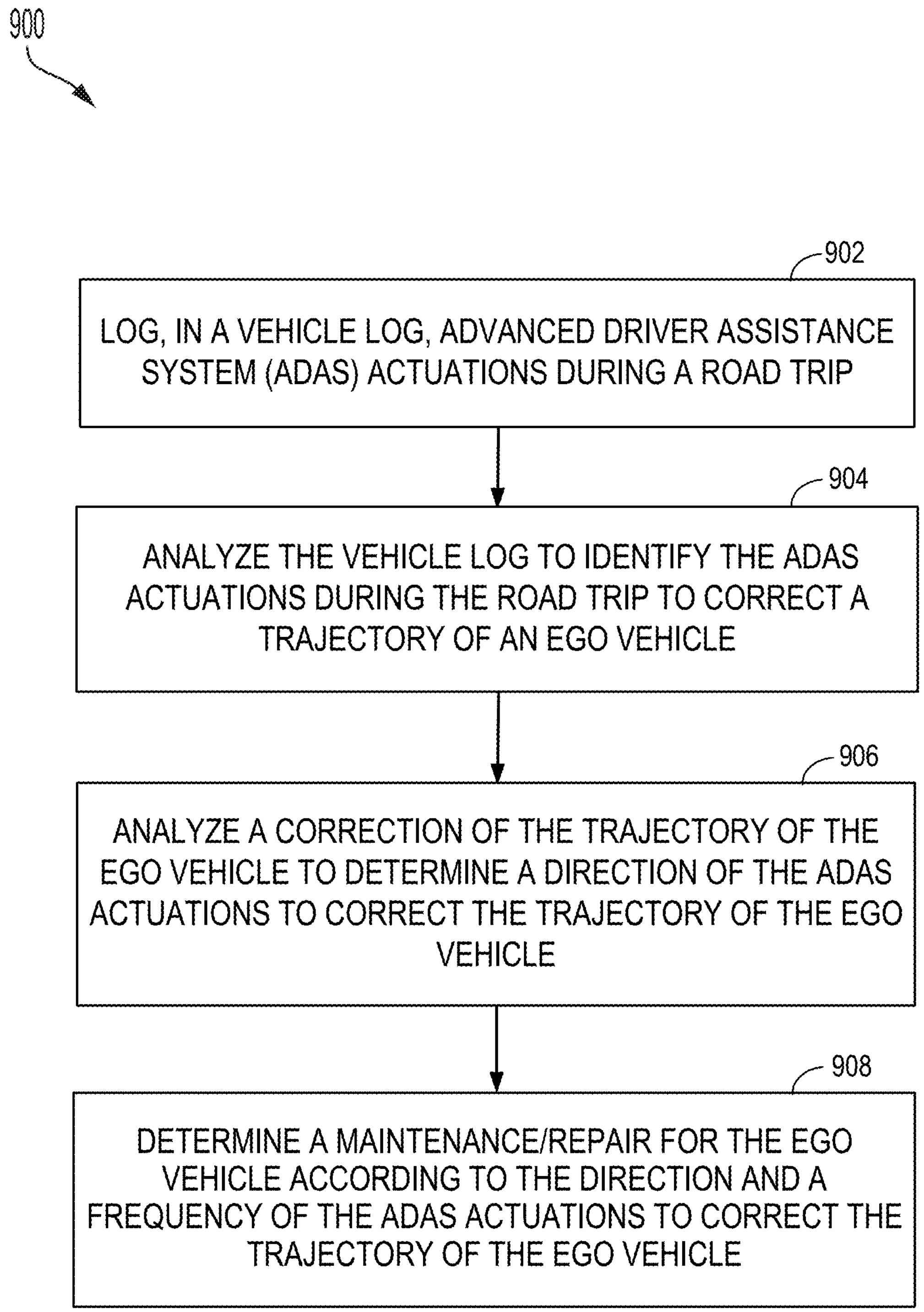
FIG. 9 is a flowchart illustrating a method for a vehicle maintenance/repair detection system, according to aspects of the present disclosure.

FIG. 9 is a flowchart illustrating a method 900 for a vehicle maintenance/repair detection system, according to aspects of the present disclosure. The method 900 begins at block 902, in which advanced driver assistance system (ADAS) actuations during a road trip are logged in a vehicle log. For example, as shown in FIG. 3, the vehicle log module 312 is utilized for logging advanced driver assistance system (ADAS) actuations during a road trip of the vehicle 350.

At block 904, the vehicle log is analyzed to identify the ADAS actuations during the road trip to correct a trajectory of an ego vehicle. For example, as shown in FIG. 3, the trajectory correction identification module 314 is configured to analyze the vehicle log to identify the ADAS features actuated to correct a trajectory of the vehicle 350 during the road trip.

At block 906, a correction of the trajectory of the ego vehicle is analyzed to determine a direction of the ADAS actuations to correct the trajectory of the ego vehicle. For example, as shown in FIG. 3, once identified, the direction and frequency module 316 is configured to analyze the correction of the trajectory of the ego vehicle to determine a direction of the ADAS features actuated to correct the trajectory of the vehicle 350 and a frequency of actuating the ADAS features.

At block 908, a maintenance/repair for the ego vehicle is determined according to the direction and a frequency of the ADAS actuations to correct the trajectory of the ego vehicle. For example, as shown in FIG. 3, the maintenance/repair module 318 determines whether the vehicle 350 needs maintenance/repair according to the direction and the frequency of the ADAS features actuated to correct the trajectory of the vehicle 350. As described in further detail below, the vehicle maintenance/repair detection system 300 may utilize the maintenance/repair module 318 to determine when a vehicle is due for maintenance or requires repairs by monitoring how often a lane keeping assist (LKA) system is actuated.

Ensuring driver and road user safety involves autonomous and ADAS systems that are calibrated to an expected level of vehicle performance. Achieving the expected level of vehicle performance involves the ability to identify when the vehicle is out of tolerance utilizing, for example, a disclosed vehicle maintenance/repair detection system. According to various aspects of the present disclosure, a vehicle maintenance/repair detection system provides driver convenience by recognizing emerging maintenance requirements, which helps save the driver time and money. The disclosed vehicle maintenance/repair detection system beneficially enhances user trust and confidence in their vehicle. Additionally, business network benefits, original equipment manufacturer (OEM) dealers and service partners could be recommended based on finding of the disclosed vehicle maintenance/repair detection system.

In some aspects of the present disclosure, the method shown in FIG. 9 may be performed by the SOC 100 (FIG. 1) or the software architecture 200 (FIG. 2) of the vehicle 150. That is, each of the elements or methods may, for example, but without limitation, be performed by the SOC 100, the software architecture 200, the processor (e.g., CPU 102), and/or other components included therein of the vehicle 150, or the vehicle maintenance/repair detection system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or specialized register files. Although the various components discussed may be described as having a specific location, such as a local component, they may also be configured in numerous ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and nonlinear model predictive control described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for a vehicle maintenance/repair detection system, the method comprising:
   - logging, in a vehicle log, advanced driver assistance system (ADAS) actuations during a road trip;
   - analyzing the vehicle log to identify the ADAS actuations during the road trip that correct a trajectory of an ego vehicle as trajectory corrections;
   - analyzing the trajectory corrections of the ego vehicle to determine a direction of the ADAS actuations to perform the trajectory corrections of the ego vehicle;
   - determining a maintenance/repair for the ego vehicle according to the direction and a frequency of the ADAS actuations to perform the trajectory corrections of the ego vehicle;
   - monitoring torque inputs to a steering wheel by the driver; and
   - determining a slope of a roadway on which the ego vehicle is traveling, in which determining the maintenance/repair for the ego vehicle comprises notifying the driver of the detected maintenance/repair when the slope of the roadway is flat.

2. The method of claim 1, further comprising:
   - notifying the driver of the detected vehicle maintenance/repair; and
   - assisting the driver with scheduling the detected vehicle maintenance/repair at a dealership associated with an original equipment manufacturer (OEM) of the ego vehicle.

3. The method of claim 1, in which the ADAS actuations comprise lane keeping assist (LKA) actuations.

4. The method of claim 1, in which analyzing the correction of the trajectory of the ego vehicle comprises:
   - determining a frequency of lane keeping assist (LKA) actuations in a same direction; and
   - determining whether the LKA actuations in a same direction occur on different roadways.

5. The method of claim 4, in which determining the maintenance/repair for the ego vehicle comprises notifying the driver of the detected maintenance/repair when the LKA actuations in the same direction occur on different roadways.

6. The method of claim 1, further comprising training a machine-learning (ML) model to predict the maintenance/repair for the ego vehicle according to the direction and the frequency of the ADAS actuations to perform the trajectory corrections of the ego vehicle.

7. A non-transitory computer-readable medium having program code recorded thereon for a vehicle maintenance/repair detection system, the program code being executed by a processor and comprising:
   - program code to log, in a vehicle log, advanced driver assistance system (ADAS) actuations during a road trip;
   - program code to analyze the vehicle log to identify the ADAS actuations during the road trip that correct a trajectory of an ego vehicle as trajectory corrections;
   - program code to analyze each of the trajectory corrections of the ego vehicle to determine a direction of the ADAS actuations to perform the trajectory corrections of the ego vehicle;
   - program code to determine a maintenance/repair for the ego vehicle according to the direction and a frequency of the ADAS actuations to perform the trajectory corrections of the ego vehicle;
   - program code to monitor torque inputs to a steering wheel by the driver; and
   - program code to determine a slope of a roadway on which the ego vehicle is traveling, in which the program code to determine the maintenance/repair for the ego vehicle comprises program code to notify the driver of the detected maintenance/repair when the slope of the roadway is flat.

8. The non-transitory computer-readable medium of claim 7, further comprising:
   - program code to notify the driver of the detected vehicle maintenance/repair; and
   - program code to assist the driver with scheduling the detected vehicle maintenance/repair at a dealership associated with an original equipment manufacturer (OEM) of the ego vehicle.

9. The non-transitory computer-readable medium of claim 7, in which the ADAS actuations comprise lane keeping assist (LKA) actuations.

10. The non-transitory computer-readable medium of claim 7, in which the program code to analyze the correction of the trajectory of the ego vehicle comprises:
   - program code to determine a frequency of lane keeping assist (LKA) actuations in a same direction; and
   - program code to determine whether the LKA actuations in a same direction occur on different roadways.

11. The non-transitory computer-readable medium of claim 10, in which the program code to determine the maintenance/repair for the ego vehicle comprises program code to notify the driver of the detected maintenance/repair when the LKA actuations in the same direction occur on different roadways.

12. The non-transitory computer-readable medium of claim 7, further comprising program code to train a machine-learning (ML) model to predict the maintenance/repair for the ego vehicle according to the direction and the frequency of the ADAS actuations to perform the trajectory corrections of the ego vehicle.

13. A vehicle maintenance/repair detection system, the system comprising:
   - a vehicle log module to log, in a vehicle log, advanced driver assistance system (ADAS) actuations during a road trip;
   - a trajectory correction identification module to analyze the vehicle log to identify the ADAS actuations during the road trip that correct a trajectory of an ego vehicle as trajectory corrections;
   - a direction and frequency module to analyze each correction of the trajectory of the ego vehicle to determine a direction of the ADAS actuations to perform the trajectory corrections of the ego vehicle; and
   - a maintenance/repair module to determine a maintenance/repair for the ego vehicle according to the direction and a frequency of the ADAS actuations to perform the trajectory corrections of the ego vehicle, to monitor torque inputs to a steering wheel by the driver, and to determine a slope of a roadway on which the ego vehicle is traveling, in which to determine the maintenance/repair for the ego vehicle the maintenance/repair module is further to notify the driver of the detected maintenance/repair when the slope of the roadway is flat.

14. The system of claim 13, in which the trajectory correction identification module is further to determine a frequency of lane keeping assist (LKA) actuations in a same direction, and to determine whether the LKA actuations in a same direction occur on different roadways.

15. The system of claim 14, in which the trajectory correction identification module is further to notify the driver of the detected maintenance/repair when the LKA actuations in the same direction occur on different roadways.

16. The system of claim 13, further comprising a machine-learning (ML) model trained to predict the maintenance/repair for the ego vehicle according to the direction and the frequency of the ADAS actuations to perform the trajectory corrections of the ego vehicle.

* * * * *